US012032451B2

United States Patent
Wonus et al.

(10) Patent No.: US 12,032,451 B2
(45) Date of Patent: Jul. 9, 2024

(54) SELECTIVE DATABASE MIGRATION

(71) Applicant: Microsoft Technology Licensing, LLC, Redmond, WA (US)

(72) Inventors: Kevin Wonus, Haymarket, VA (US); Trevor Scott Anderson, Lovettsville, VA (US)

(73) Assignee: Microsoft Technology Licensing, LLP, Redmond, WA (US)

( * ) Notice: Subject to any disclaimer, the term of this patent is extended or adjusted under 35 U.S.C. 154(b) by 105 days.

(21) Appl. No.: 17/826,619

(22) Filed: May 27, 2022

(65) Prior Publication Data

US 2023/0385160 A1 Nov. 30, 2023

(51) Int. Cl.
*G06F 16/00* (2019.01)
*G06F 11/14* (2006.01)
*G06F 16/21* (2019.01)
*G06F 16/27* (2019.01)

(52) U.S. Cl.
CPC ...... *G06F 11/1464* (2013.01); *G06F 11/1461* (2013.01); *G06F 11/1469* (2013.01); *G06F 16/21* (2019.01); *G06F 16/27* (2019.01); *G06F 2201/80* (2013.01); *G06F 2201/84* (2013.01)

(58) Field of Classification Search
CPC ............. G06F 11/1464; G06F 11/1461; G06F 11/1469; G06F 2201/80; G06F 2201/84; G06F 16/21; G06F 16/27
USPC ....................................................... 707/640
See application file for complete search history.

(56) References Cited

U.S. PATENT DOCUMENTS

| | | | |
|---|---|---|---|
| 2003/0009431 A1* | 1/2003 | Souder | G06F 16/27 |
| 2007/0239774 A1 | 10/2007 | Bodily et al. | |
| 2013/0282662 A1* | 10/2013 | Kumarasamy | G06F 3/0689 707/649 |
| 2015/0378771 A1* | 12/2015 | Tarasuk-Levin | G06F 9/45558 718/1 |
| 2016/0314046 A1 | 10/2016 | Kumarasamy | |
| 2020/0409738 A1* | 12/2020 | Naidu | G06F 11/1464 |
| 2022/0255946 A1* | 8/2022 | Sims | G06F 21/6245 |

OTHER PUBLICATIONS

"International Search Report and Written Opinion Issued in PCT Application No. PCT/US23/018793", dated Jul. 21, 2023, 13 Pages.

* cited by examiner

*Primary Examiner* — Monica M Pyo
(74) *Attorney, Agent, or Firm* — ArentFox Schiff LLP

(57) ABSTRACT

Selective migration of a database in which one or more computing devices establish a creation specification for a snapshot of a subset of a source database of a source database management system (DBMS). The device(s) receive instruction to create the snapshot in accordance with the creation specification. The device(s) retrieve, in response to receiving the instruction to create, record(s) from the source database in accordance with the creation specification. The device communicates, via broadcast, the retrieved records to one or more creation listeners; and serializes, by each listener and in accordance with the creation specification, the broadcast records into the snapshot comprising the fragments and the parts.

30 Claims, 7 Drawing Sheets

200

202

Establishing a creation specification for a serialized snapshot of a subset of a source database of a source database management system (DBMS), at least in part by specification of an identity of the source database from which the snapshot is to be created, a selection criteria of records from the source database to be included in the snapshot, and a desired fragmentation of the selected records in the snapshot, each fragment comprising a named path in a hierarchical file system, each fragment comprising one or more parts, and each part comprising a file within a fragment

204

Receiving a command to create the snapshot in accordance with the creation specification

206

Retrieving, in response to receiving the command to create, one or more records from the source database in accordance with the creation specification

208

Communicating, via broadcast, the retrieved records to one or more creation listeners

210

Serializing, by each listener and in accordance with the creation specification, the broadcast records into the snapshot comprising the fragments and the parts

SELECTIVE DATABASE MIGRATION

BACKGROUND

A collection of data, organized in a particular fashion and stored and accessed electronically, is typically referred to as a database. While a collection of flat files can be described as a rudimentary database, most practical database implementations involve i) a more sophisticated structure that supports, among other things, efficient data representation and storage (often distributed in clusters), and ii) a database management system (DBMS) application that handles interfacing with end users, with other applications, and with the database itself. The collection of the database and the DMBS can be characterized as conforming to a certain model/schema.

In general, a database created with one DBMS is not easily migrated to another DBMS. Even a database created with one DBMS in a given environment (e.g., network topology and connectivity, cluster configuration, hardware platform, operating system) may not be readily portable to a different environment using the same DBMS. A typical database migration project faces challenges in each of cost, schedule and performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In examples of the technology disclosed herein, methods, devices, and computer-readable media for selective database migration include establishing a creation specification for a snapshot of a subset of a source database of a source database management system (DBMS), at least in part by specification of: an identity of the source database from which the snapshot is to be created, a selection criteria of records from the source database to be included in the snap-shot, and a desired fragmentation of the selected records in the snapshot. Each fragment is a named path in a hierarchical file system. Each fragment includes one or more parts, and each part comprising a file within a fragment. Such examples include receiving an instruction to create the snapshot in accordance with the creation specification. In response to receiving the instruction to create, such examples retrieve one or more records from the source database in accordance with the creation specification. Such examples of the technology communicate, via broadcast, the retrieved records to one or more creation listeners; and serialize, by each listener and in accordance with the creation specification, the broad-cast records into the snapshot comprising the fragments and the parts.

In some examples, the identity comprises one or more of an identity of the source DBMS and a location of the source database. In some examples, the selection criteria comprises one or more of: an identity of one or more clusters of the source database, and one or more values of one or more fields of the records to be included. In some examples, the desired fragmentation comprises one or more of: a maximum fragment size, a maximum part size, and the identity of one or more clusters of the source database by which to fragment the source database. In some examples, a structure of the hierarchical file system is agnostic with respect to the source DBMS. In some examples, the broadcast comprises a plurality of datagrams of a packet-switched network. In some such examples, the datagrams are user datagram protocol (UDP) data-grams. In some examples, each listener corresponds to a single cluster of one or more clusters identified in the creation specification. In some examples, one of the creation specification and the instruction to create is received via one of a REST interface and an input to a console application Some examples further include acknowledging a snapshot status of the broad-cast records, the status comprising one of at least: successful creation of the record in the snap-shot and unsuccessful creation of the record to the snapshot. In some such examples, acknowledging includes saving each acknowledgment in one or more files of the snapshot.

Some examples further include establishing a migration specification for the snapshot, at least in part by specification of: an identity of a target database to which the snapshot is to be migrated, a migration selection criteria of one or more fragments and parts from the snapshot to be migrated to the target database, and receiving an instruction to migrate the snapshot in accordance with the migration specification; and deserializing, by each of one or more migration listeners and in response to receiving the instruction to migrate, the snapshot in accordance with the migration specification. In some such examples, the identity comprises one or more of an identity of a target DBMS and a desired location of the target database. In some such examples, the migration selection criteria comprised one or more of: one or more values of one or more fields of the records to be migrated, an identity of one or more source clusters from which to migrate, an identity of one or more target clusters for migration. Some such examples include acknowledging a migration status of the records, the status comprising one of at least: successful migration and unsuccessful migration. In some such examples, acknowledgment comprises saving each acknowledgment in one or more files of the snapshot. In some such examples, one of the migration specification and the instruction to migrate is received via one of a REST interface and an input to a console application. Some such examples further include establishing, prior to receiving the instruction to create, a keymap specification mapping references between source database tables, wherein, snapshot deserialization is further performed in accordance with the keymap specification.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a flowchart of methods of selective migration of a database, in accordance with examples of the technology disclosed herein.

DETAILED DESCRIPTION

Figure 1:
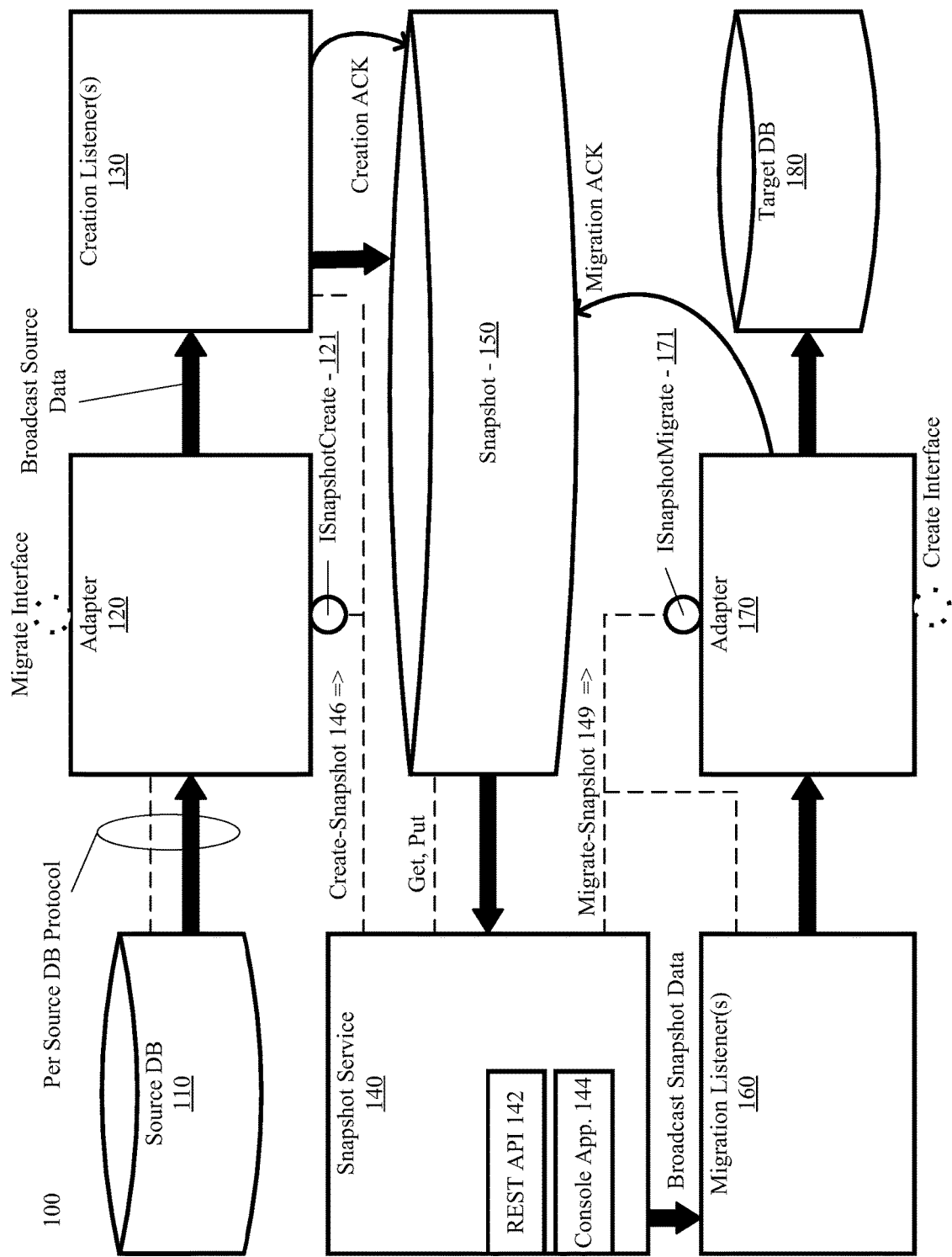
FIG. 1 illustrates an architecture for selective database migration in accordance with examples of the technology disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Database backups are a common practice for enterprise databases and are indispensable for disaster recovery. While often utilized for database migrations, most backup/restore implementations lack versatility with respect to migration operations and pipelines. For example, conventional database restoration is expected to produce an exact replica from the backup. It is normally used to recover from catastrophic failure. Typically, restoration presumes that the shape & capacity of the target clusters are compatible (if not identical) to the shape produced by the backup, and that the database vendor/product is the same as that which produced by the backup.

On the other hand, database migration does not always demand full replication. Partial replication is sometimes preferred or required. Migration can be used to change database vendors or to produce a subset of the source database for subsequent testing or staging. Further, migration may involve wildly different shaped clusters than were implemented on the source platform. Migration may reconstitute a database vendor/product from a version generated by a different database vendor/product.

Database migrations are typically implemented with custom code for each migration—even from a source to a target with the same DMBS and the same operating system (OS). Migration is described herein as "snapshot creation" from a source database of a source DBMS, followed by "snapshot migration" to one or more target databases of a target DMBS. The source database and the target database may have different structures. The source DBMS and the target DBMS may be different DBMSs—even executing under a different OS. As described herein, examples of selective database migration employ, inter alia, a hierarchical file system, filtering of source records on serialization into the file system, and filtering of the snapshot on deserialization into the target environment. Some examples include a datagram protocol with acknowledgement features inherent or supplemented, at least in part to assure full deserialization of records into the target database.

Examples of the technology disclosed herein can provide flexibility in how much data is to be reconstituted, the shape of the reconstituted clusters, and even allows targeting a different database vendor/product from that which generated the source snapshot. Further, some databases are so large and have specialized cluster layouts that no suitable arena exists to test a full database restoration without overwriting the existing production system. Examples of the technology disclosed herein allow limited migration for testing, allowing a user to select portions of the source database to migrate. For example, a filtering process can be specific to a cluster as defined by the source, specific to a cluster as defined by the target, and/or by individual field values of each record. The net result is that snapshot migration can be tested where the available space required on the migration target is a mere fraction of the snapshot itself. This facilitates snapshot testing, while utilizing minimal resource requirements on the target/test system.

Examples of the technology disclosed herein can provide increased portability over some approaches, such as supports any operating system that implements a hierarchical folder structure (this includes Windows™, Linux, MacOS, iOS, Android, as well as may real-time operating systems [RTOS], even older RTOS like MS-DOS). Examples support creation of a snapshot from any database where a suitable database adaptor has been provided. Examples, support separate ad hoc reconstitution of a snapshot to any database where a suitable database adaptor has been provided.

Database migration under examples of the technology disclosed herein can use filters during reconstitution to obtain a valid subset of the source snapshot. The DBMS of the target migration need not be the same as the DMBS of the snapshot source. The cluster layout/configuration of the snapshot target need not be the same as the cluster layout/configuration of the snapshot source. In fact, the target database vendor/product need not be known at the time of snapshot creation, since the two activities are only lightly coupled—a separate migration instance of the technology disclosed herein can use an air-gapped version of a snapshot created using a separate instance of the technology on the source platform. One consequence is that a single snapshot can target many different vendors/products and/or cluster layouts to experiment with prototypes and feasibility studies.

In certain examples, a snapshot is a collection of files within a corresponding structured hierarchy of folders. Snapshots can be transported using a variety of methods to/from practically any OS. For example, snapshots can be streamed using a web-service under various protocols; snapshots can be saved to media and physically transported to another location; archives of snapshots can be created (e.g. .zip, .tar, .cpio) and copied using FTP/SFTP or HTTP/HTTPS; and snapshots can be copied using built-in OS commands/applications in conjunction with network filesystems. Typical modern OS and most RTOS have everything required to support file-based snapshots.

Turning now to the figures, examples are depicted with reference to one or more components and one or more methods that may perform the actions or operations described herein, where components and/or actions/operations in dashed line may be optional. Although the operations described below in flow charts and call flows are presented in a particular order and/or as being performed by an example component, the ordering of the actions and the components performing the actions may be varied, in some examples, depending on the implementation. Moreover, in some examples, one or more of the actions, functions, and/or described components may be performed by a specially programmed processor, a processor executing specially programmed software or computer-readable media, or by any other combination of a hardware component and/or a software component capable of performing the described actions or functions.

Referring to FIG. 1, an architecture 100 for selective database migration in accordance with examples of the technology disclosed herein is illustrated. In such an architecture 100, a source database 110, e.g., a database using MongoDB, Cosmos DB, or other similar DBMS, operating under a given OS, is identified for migration. At this point it is not necessary to identify the target database 180, its DBMS, or even its operating system.

Referring to FIG. 2, and continuing to refer to FIG. 1 for context, a flowchart of methods 200 of selective database migration is shown, in accordance with examples of the technology disclosed herein. In such methods 200, one or more computing devices establish a creation specification for a snapshot of a subset of a source database of a source DBMS—Block 202. The specification includes i) an identity of the source database from which the snapshot is to be created, ii) a selection criteria of records from the source database to be included in the snapshot, and iii) a desired fragmentation of the selected records in the snapshot. In particular, each fragment corresponds to a named path (e.g., a folder) in a hierarchical file system. Each fragment can be composed of one or more parts, e.g., files in the fragment path.

In a continuing example, process snapshot service 140 uses a "put(*-config)" function to write the "creation-config" file of TABLE 1 as part of snapshot 150. A complementary "get-*" command functions to get/retrieve a status (e.g., a "*-ACK" file for acknowledging creation or migration of portions of the snapshot 150) or any existing "*-config" file. Each of these files is stored in the snapshot 150 in the continuing example.

The creation-config file of TABLE 1, in Yet Another Markup Language (YAML), specifies "MongoDB" as the identity of the source database 110. The creation-config file identifies that selection criteria for records from the source database 110 to be included in snapshot 150 are those from clusters "Eastern USA," "Western USA," and "Canada" filtered on the field value "state-or-province !='CA'." The creation-config file further specifies the location of an adapter 120 (described elsewhere) to be used in creating the snapshot 150.

Further, the creation-config file sets a max fragmentation part/file size ("max-part-size") to 2 MB and specifies to fragment by "cluster name, state-or-province." In some examples, the identification of the source database 110 includes one or more of an identity of the source DBMS and a location of the source database. In some examples, the selection criteria include one or more of: an identity of one or more clusters of the source database, and one or more values of one or more fields of the records to be included. In some examples, the desired fragmentation includes one or more of: a maximum fragment size, a maximum part size, and the identity of one or more clusters of the source database by which to fragment the source database. In some examples, the structure of the hierarchical file system is agnostic with respect to the source DBMS. As such, once the snapshot is created, it can be physically transferred on media across an air gap. The information contained in the *-config and *-ACK files can be used in creating a snapshot 150, in confirming creation of records in a snapshot 150, in migrating a snapshot 150 to a target database 180, and in confirming migration of records from a snapshot 150 to a target database 180.

TABLE 1

Creation-Config File database:
    description: "MongoDB"
    adaptor: "C:/MyAdaptors/snapshot-db-adaptor-mongodb-v4.dll"
selection:
    clusters:
    - Eastern USA
    - Western USA
    - Canada
    filter: "state-or-province != 'CA' "
fragmentation:
    max-part-size: 2mb
    fragment-by: "cluster-name, state-or-province"

Figure 3:
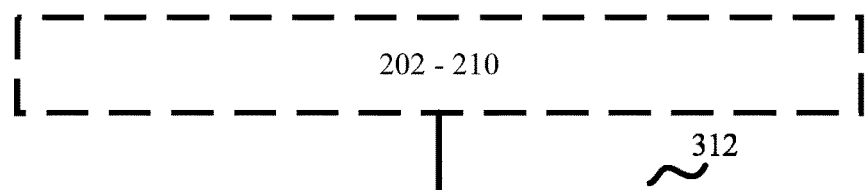
FIG. 3 is a flowchart of methods of selective migration of a database, in accordance with examples of the technology disclosed herein.
Figure 7:
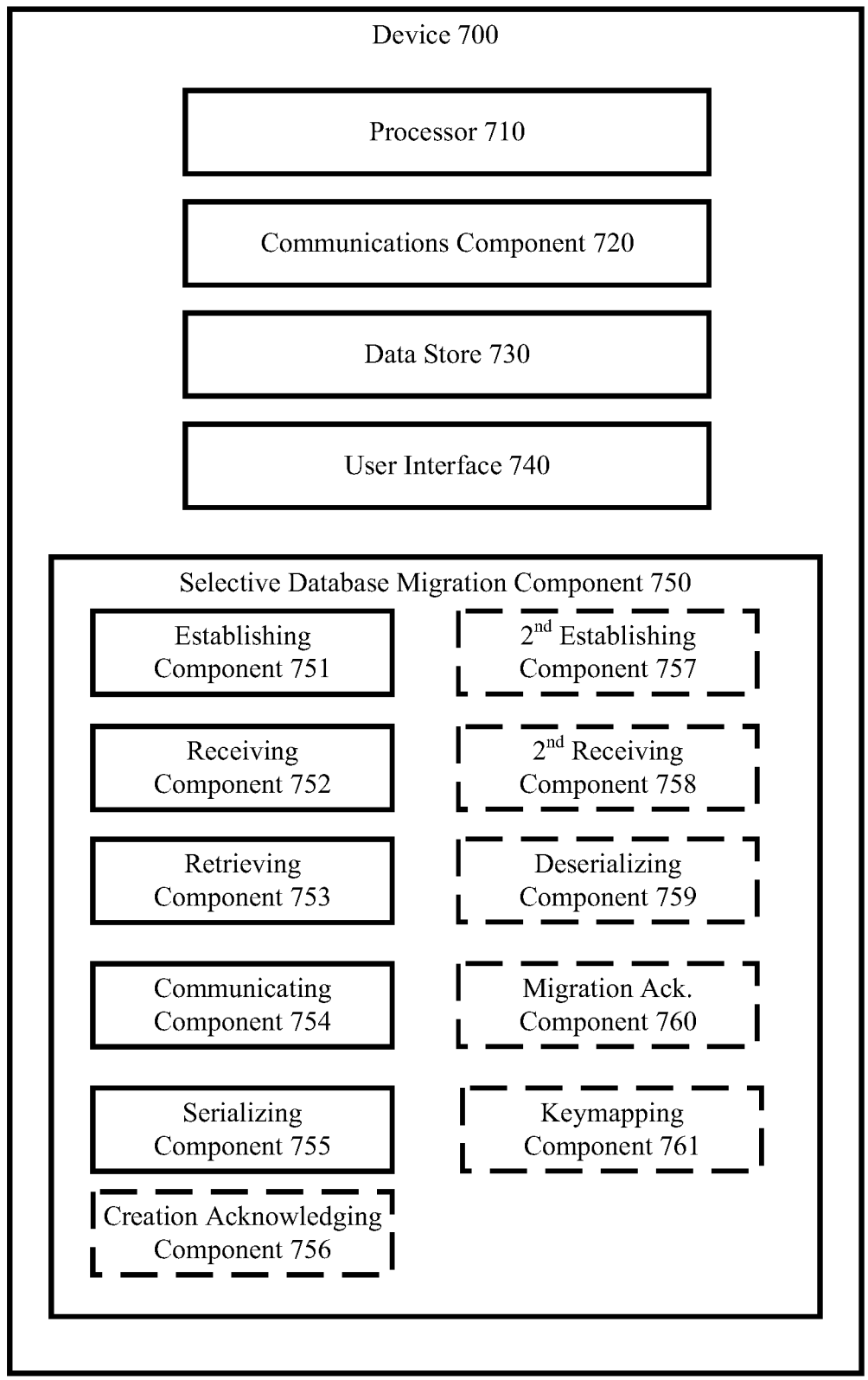
FIG. 7 is a block diagram of an example computing device having components configured to perform a computer-implemented method for selective migration of a database, in accordance with the technology disclosed herein.

Referring to FIG. 7, and continuing to refer to prior figures for context, a representation of a device 700 for selective database migration implementing a method of FIG. 3 is shown, in accordance with examples of the technology disclosed herein. Device 700, described in more detail below, is one of one or more such devices implementing the method. In some examples, device 700 includes selective database migration component 750. The selective database migration component 750 includes establishing component 751. In some examples, establishing component 751 establishes a creation specification for a serialized snapshot of a subset of a source database of a source DBMS. Accordingly, establishing component 751, in conjunction with other elements of device 700 provides means for establishing a creation specification for a serialized snapshot of a subset of a source database of a source DBMS.

The one or more computing devices receive an instruction to create the snapshot in accordance with the creation specification—Block 204. In the continuing example, the device executing snapshot service 140 receives the instruction, via a REST API 142, to create a snapshot. In other examples, the device(s) executing the snapshot service 140 present(s) the snapshot service 140 as a console application 144. In some examples, the instruction to create a snapshot 150 is received concurrent with the create-config file/input or with the create-config file/input as an argument.

Referring again to FIG. 7, and continuing to refer to prior figures for context, The selective database migration component 750 includes receiving component 752. In some examples, receiving component 752 receives an instruction to create the snapshot in accordance with the creation specification. Accordingly, receiving component 752, in conjunction with other elements of device 700 provides means for receiving an instruction to create the snapshot in accordance with the creation specification.

The one or more computing devices, in response to receiving the instruction to create, retrieves one or more records from the source database in accordance with the creation specification—Block 206. In the continuing example, the snapshot service 140 sends a "create-snapshot" 146 command to one or more creation adapters 120. One role of an adapter in examples of the technology disclosed herein is to provide an interface between the technology and each of the source database 110 and target database 180—either by directly interfacing with the particular database or by interfacing via the corresponding DBMS. This approach helps to isolate the source-specific code or target-specific code to the adapters. Once an adapter (creation or migration) is created, it can be reused for and database/model/schema of the given DMBS operating under a given OS. In some examples, a given adapter is instantiated for either a creation role (as with creation adapter 120 with interface "ISnapshotCreate" 121) or a migration role (as with migration adapter 170 with interface "ISnapshotMigrate" 171), or both. An adapter instantiated as creation adapter 120 presents an ISnapshotCreate 121 for receiving the create-snapshot command from the snapshot service 140. Upon receiving the create-snapshot command, each creation adapter 120 retrieves records, per the source database 110 protocol, from the source database 110 in accordance with the creation-config file—e.g., in the continuing example, from source database 110 clusters {Eastern USA, Western USA, Canada} where "state-or-province!='CA'." The create-snapshot command is also used to initiate one or more creation listeners 130 to function as described below. In the continuing example, the command and the ISnapshotCreate interface communicates via a datagram service, for example, one of the Internet Protocol (IP) datagram services such as connectionless User Datagram Protocol (UDP).

Referring again to FIG. 7, and continuing to refer to prior figures for context, The selective database migration component 750 includes retrieving component 753. In some examples, retrieving component 753 retrieves, in response to receiving the command to create, one or more records from the source database in accordance with the creation specification. Accordingly, retrieving component 753, in conjunction with other elements of device 700 provides means for retrieving, in response to receiving the command to create, one or more records from the source database in accordance with the creation specification.

The device communicates, via broadcast, the retrieved records to one or more creation listeners—Block 208. In the continuing example, the one or more creation adapters 120 broadcast the retrieved source data under a data interchange format such as JavaScript Object Notation (JSON) or other data serialization formats—e.g., YAML, Extensible Markup Language (XML), Google Protocol Buffers, "message pack," and other binary serialization formats. In the continuing example, broadcast of retrieved records uses a datagram service, for example, one of the Internet Protocol (IP) datagram services such as connectionless User Datagram Protocol (UDP). A standard open-source message-queue, e.g., Advanced Message Queuing Protocol (AMQP) with a 'settlement policy,' can be employed. Any message protocol that includes an acknowledgment (ACK) can be utilized to assure full generation of records into the snapshot 150 in accordance with the user-supplied creation-config selection criteria. In some examples, broadcast of retrieved records is akin to a publication/subscription model, where each creation listener 130 listens for broadcast source data relevant to its scope for writing to the snapshot 150.

Referring again to FIG. 7, and continuing to refer to prior figures for context, The selective database migration component 750 includes communicating component 754. In some examples, communicating component 754 communicates, via broadcast, the retrieved records to one or more creation listeners. Accordingly, communicating component 754, in conjunction with other elements of device 700 provides means for communicating, via broadcast, the retrieved records to one or more creation listeners.

Each listener serializes the broadcast records into the snapshot comprising the fragments and the parts in accordance with the creation specification—Block 210. In the continuing example, one or more creation listeners 130 listen to the broadcast records. Each creation listener 130 is configured to write certain records to certain fragments and parts of the snapshot 150 in accordance with the creation-config file of TABLE 1.

In some examples, records are fragmented in accordance with YAML spec (e.g., fragment-by: "cluster-name, state-or-province"). This results in, e.g., fragment [folders] named: British_Columbia-Cluster1, British_Columbia-Cluster2, . . . , British_Columbia-ClusterNbc, Ohio-Cluster1, Ohio-Cluster2, . . . , Ohio-ClusterN, etc. Parts [files] can be characterized by size and/or record count: e.g., max-part-size: 2 mb [max 2 mb per part]. As another example: max-part-record-cnt: 10 [max 10 records per part]. In some examples, both settings can be provided, and the first one to trigger limits the part content. In some examples, records are all or nothing; unless record size exceeds size, those records are split across multiple parts.

As with broadcasting, a standard open-source message-queue, e.g., Advanced Message Queuing Protocol (AMQP) with a 'settlement policy,' can be employed. Any message protocol that includes an acknowledgment (ACK) can be utilized to assure full generation of records into the snapshot 150 in accordance with the user-supplied creation-config selection criteria. In some examples, each creation listener 130 corresponds to a single cluster of one or more clusters identified in the creation specification.

Referring again to FIG. 7, and continuing to refer to prior figures for context, The selective database migration component 750 includes serializing component 755. In some examples, serializing component 755 serializes the broadcast records into the snapshot comprising the fragments and the parts in accordance with the creation specification. Accordingly, serializing component 755, in conjunction with other elements of device 700, provides means for serializing the broadcast records into the snapshot comprising the fragments and the parts in accordance with the creation specification.

Referring to FIG. 3, and continuing to prior figures for context, a flowchart of methods 300 of selective database migration is shown, in accordance with examples of the technology disclosed herein. In such methods 300, Block 202 Block 210 are performed as described in conjunction with FIG. 2 above. In such methods, the one or more computing devices acknowledges a snapshot status of the broadcast records—Block 312. The status comprises one of at least: successful creation of the record in the snapshot, and unsuccessful creation of the record to the snapshot. In the continuing application, the acknowledgment of records written into parts in fragments of the snapshot 150 include saving each acknowledgment in one or more files of the snapshot 150.

Referring again to FIG. 7, and continuing to refer to prior figures for context, The selective database migration component 750 includes creation acknowledgement component 756. In some examples, creation acknowledgement component 756 acknowledges a snapshot status of the broadcast records. Accordingly, creation acknowledgement component 756, in conjunction with other elements of device 700, provides means for acknowledging a snapshot status of the broadcast records.

Figure 4:
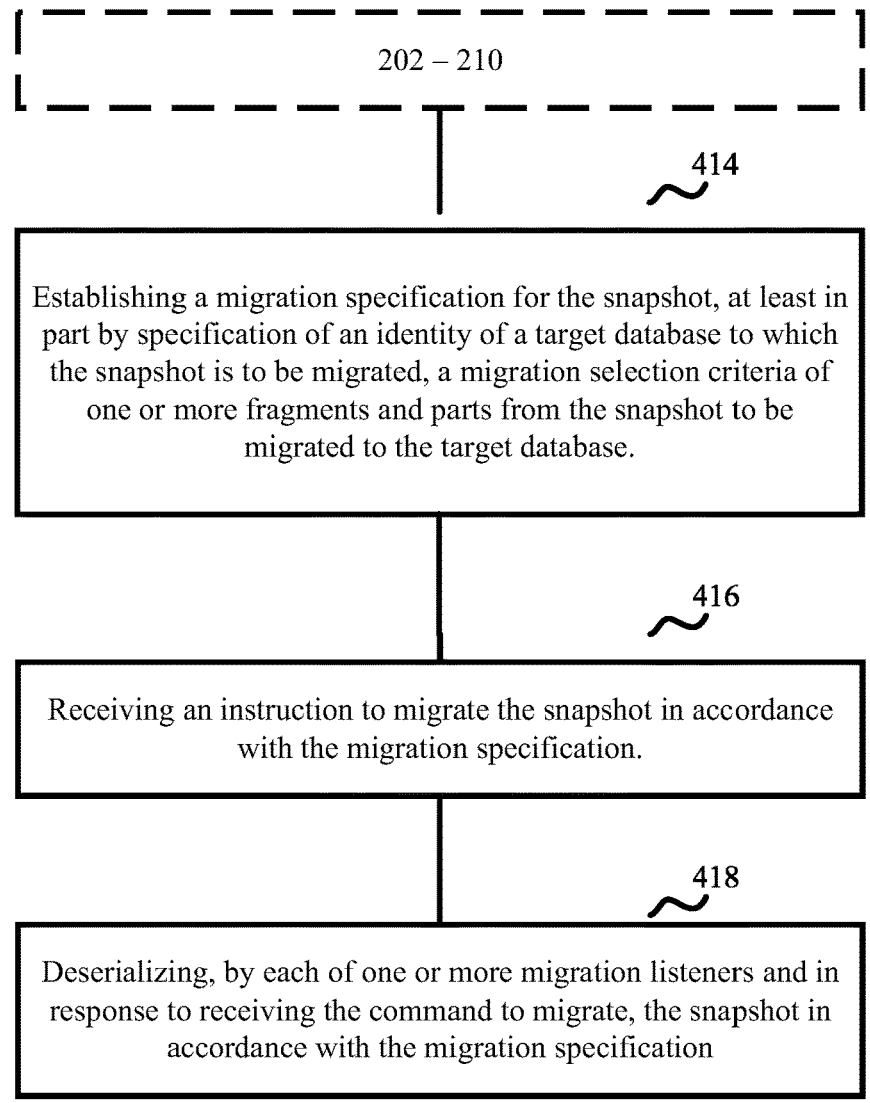
FIG. 4 is a flowchart of methods of selective migration of a database, in accordance with examples of the technology disclosed herein.

Referring to FIG. 4, and continuing to prior figures for context, a flowchart of methods 400 of selective database migration is shown, in accordance with examples of the technology disclosed herein. In such methods 400, Block 202-Block 210 are performed as described in conjunction with FIG. 2 above. In such methods, the one or more computing devices establishes a migration specification for the snapshot—Block 414. The specification includes i) an identity of a target database to which the snapshot is to be migrated, and ii) a migration selection criterion of one or more fragments and parts from the snapshot to be migrated to the target database.

In a continuing example, process snapshot service 140 uses a "put(*-config)" function to write the "migration-config" file of TABLE 2 as part of snapshot 150. The migration-config file of TABLE 2 includes database/migration adaptor specification, selection-criteria, and partitioning-specifications. The migration-config file specifies "CosmosDB" as the identity of the source database 110, and the location of migration adapter 170 as "C:/MyAdaptors/snapshot-db-adaptor-cosmosdb-v5.1.dll." The creation-config file identifies that selection criteria for records from the snapshot 150 to be included in target database 180 are those where "customer-name!='Microsoft'." The partitioning is between "USA" and "Canada," and within "USA" by "cluster-name=='Eastern USA'||cluster-name=='Western USA'."

TABLE 2

Migration-Config File database:
  description: "Cosmos DB"
  adaptor: "C:/MyAdaptors/snapshot-db-adaptor-cosmosdb-v5.1.dll"
selection:
  filter: "customer-name! = 'Microsoft' "
partition:
  USA: "cluster-name == 'Eastern USA' || cluster-name == 'Western USA' "
  Canada: "cluster-name == ' Canada' "

In some examples, the identity comprises one or more of an identity of a target DBMS and a desired location of the target database 180. In some examples, the selection criteria include one or more of: an identity of one or more clusters of the source database 110, and one or more values of one or more fields of the records to be included. In some examples, the migration selection criteria comprised one or more of: one or more values of one or more fields of the records to be migrated, an identity of one or more source clusters from which to migrate, an identity of one or more target clusters for migration.

Referring to FIG. 7, in some examples, device 700 includes selective database migration component 750. The selective database migration component 750 includes second establishing component 757. In some examples, second establishing component 757 establishes a migration specification for the snapshot. Accordingly, second establishing component 757, in conjunction with other elements of device 700 provides means for establishing a migration specification for the snapshot.

The one or more computing devices receive an instruction to migrate the snapshot in accordance with the migration specification—Block 416. In the continuing example, the device executing snapshot service 140 receives the instruction, via a REST API 142, to create a snapshot. In other examples, the device(s) executing the snapshot service 140 present(s) the snapshot service 140 as a console application 144. In some examples, the instruction to create a snapshot 150 is received concurrent with the migration-config file/input or with the migration-config file/input as an argument.

Referring again to FIG. 7, and continuing to refer to prior figures for context, The selective database migration component 750 includes second receiving component 758. In some examples, second receiving component 758 receives an instruction to migrate the snapshot in accordance with the migration specification. Accordingly, second receiving component 758, in conjunction with other elements of device 700 provides means for receiving an instruction to migrate the snapshot in accordance with the migration specification.

Each migration listener, in response to the one or more computing devices receiving the instruction to migrate, deserializes the snapshot in accordance with the migration specification—Block 418. In the continuing example, in response to the snapshot service 140 receiving the instruction to migrate a given snapshot to a target database 180, the snapshot service 140 issues a migrate-snapshot 149 command (to both migration listener(s) 160 and migration adapter(s) 170), then extracts and broadcasts the specific records (in accordance with the migration-config file stored in the snapshot 150) to one or more migration listeners 160. Each migration listener 160 sends the appropriate records from the records broadcast by the snapshot service 140 with information used by each adapter 170 to write the record to the proper cluster of the target database 180. In the continuing example, the number of migration listeners 160 corresponds to the number of target clusters, while the number of migration adapters 170 is based on the total volume of the target database.

As above, a standard open-source message-queue, e.g., Advanced Message Queuing Protocol (AMQP) with a 'settlement policy,' can be employed. Any message protocol that includes an acknowledgment (ACK) can be utilized to assure full generation of records into the snapshot in accordance with the user-supplied creation-config selection criteria.

Referring again to FIG. 7, and continuing to refer to prior figures for context, The selective database migration component 750 includes deserializing component 759. In some examples, deserializing component 759 serializes the broadcast records into the snapshot comprising the fragments and the parts in accordance with the creation specification. Accordingly, deserializing component 759, in conjunction with other elements of device 700, provides means for serializing the broadcast records into the snapshot comprising the fragments and the parts in accordance with the creation specification.

Figure 5:
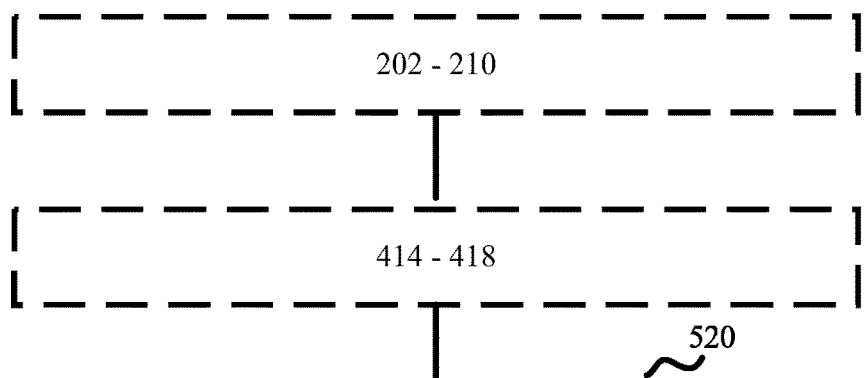
FIG. 5 is a flowchart of methods of selective migration of a database, in accordance with examples of the technology disclosed herein.

Referring to FIG. 5, and continuing to prior figures for context, a flowchart of methods 500 of selective database migration is shown, in accordance with examples of the technology disclosed herein. In such methods 300, Block 202-Block 210 and Block 414-Block 418 are performed as described in conjunction with FIG. 2 and FIG. 4 above. In such methods, the one or more computing devices acknowledges a migration status of the records—Block 520. The status comprises one of at least: successful migration of the record from the snapshot to the target, and unsuccessful migration of the record from the snapshot to the target. In the continuing application, the acknowledgment of record migration includes saving each acknowledgment in one or more files of the snapshot 150, e.g., a migration-ACK file.

Referring again to FIG. 7, and continuing to refer to prior figures for context, The selective database migration component 750 includes migration acknowledgement component 760. In some examples, migration acknowledgement component 760 acknowledges a migration status of the records. Accordingly, migration acknowledgement component 760, in conjunction with other elements of device 700, provides means for acknowledging a migration status of the records.

Figure 6:
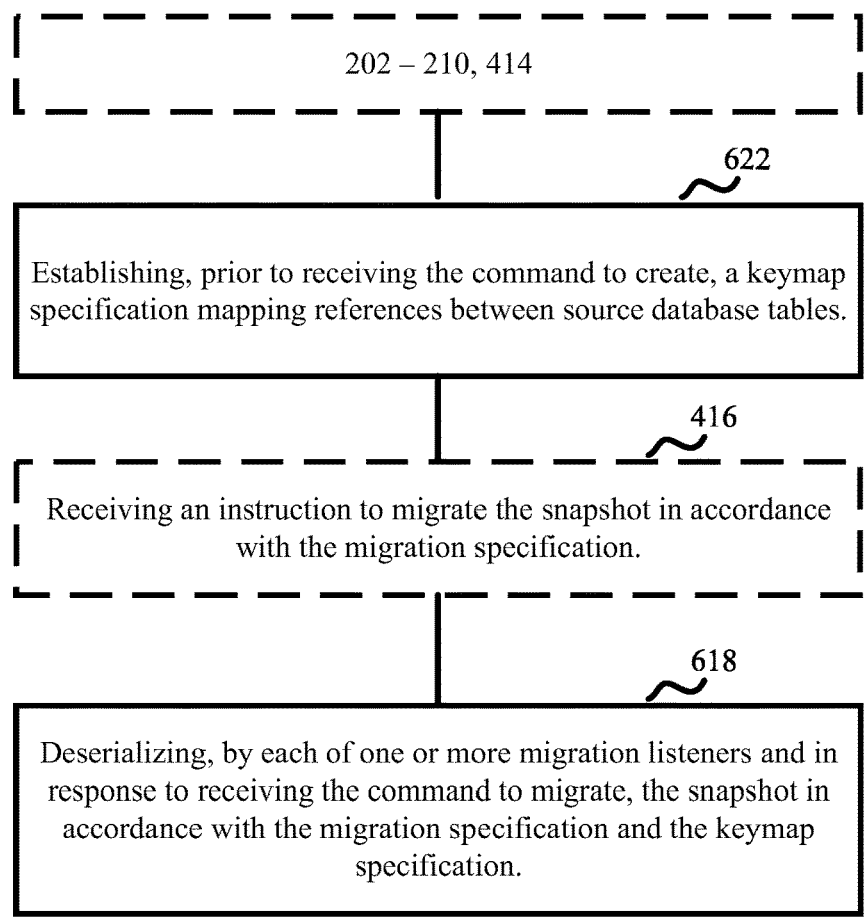
FIG. 6 is a flowchart of methods of selective migration of a database, in accordance with examples of the technology disclosed herein.

Referring to FIG. 6, and continuing to prior figures for context, a flowchart of methods 600 of selective database migration is shown, in accordance with examples of the technology disclosed herein. In such methods 600, Block 202— Block 210, Block 414 and Block 416 are performed as described in conjunction with FIG. 2 and FIG. 4 above. In such methods, the one or more computing devices establishing, prior to receiving the command to create, a keymap specification mapping references between source database tables—Block 622. As an example, consider a source database that supports UInt128 (an unsigned 128-bit integer type), but the target database does not. Further assume that the UInt128 value is used as a unique key to a lookup table in the source database. If the target database supports GUID (global unique ID) data type, in such examples unique keys can be generated on the fly when loading the lookup table in the target database. However, references from other tables need to map their references to the new target lookup key. A keymap addresses such migration issues to preserve referential values between tables. In such methods, deserialization is further in accordance with the keymap specification—Block 618.

Referring again to FIG. 7, and continuing to refer to prior figures for context, The selective database migration component 750 includes keymapping component 761. In some examples, keymapping component 761 establishes, prior to receiving the command to create, a keymap specification mapping references between source database tables Accordingly, keymapping component 761, in conjunction with other elements of device 700, provides means for establishing, prior to receiving the command to create, a keymap specification mapping references between source database tables.

Generally, FIG. 7 illustrates an example of a device 700 including optional component details. In one aspect, device 700 includes processor 710 for carrying out processing functions associated with one or more of components and functions described herein. Processor 710 can include a single or multiple set of processors or multi-core processors. Moreover, processor 710 can be implemented as an integrated processing system and/or a distributed processing system.

Device 700 further includes data store 730, e.g., for storing local versions of operating systems (or components thereof) and/or applications being executed by processor 710, such as Selective Database Migration Component 750. Data store 730 can include a type of memory usable by a computer, such as random-access memory (RAM), read only memory (ROM), tapes, magnetic discs, optical discs, volatile memory, non-volatile memory, and any combination thereof.

Further, device 700 may include a communications component 720 that provides for establishing and maintaining communications with one or more other devices, parties, entities, etc. utilizing hardware, software, and services as described herein. Communications component 720 may carry communications between components on device 700, as well as between device 700 and external devices, such as devices located across a communications network and/or devices serially or locally connected to device 700. For example, communications component 720 may include one or more buses, and may further include transmit chain components and receive chain components associated with a wireless or wired transmitter and receiver, respectively, operable for interfacing with external devices.

Additionally, device 700 may include a data store 730, which can be any suitable combination of hardware and/or software, that provides for mass storage of information, databases, and programs employed in connection with aspects described herein. For example, data store 730 may be or may include a data repository for operating systems (or components thereof), applications, related parameters, etc. not currently being executed by processor 710. In addition, data store 730 may be a data repository for the Selective Database Migration Component 750.

Device 700 may optionally include a user interface component 740 operable to receive inputs from a user of device 700 (e.g., datacenter maintenance personnel) and further operable to generate outputs for presentation to the user. User interface component 740 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 740 may include one or more output devices, including but not limited to a display, a speaker, a haptic feedback mechanism, a printer, any other mechanism capable of presenting an output to a user, or any combination thereof.

In some examples, the technology disclosed herein includes computer-implemented methods, devices, and computer program products for selective migration of a database. Example #1 includes establishing a creation specification for a snapshot of a subset of a source database of a source database management system (DBMS), at least in part by specification of: an identity of the source database from which the snapshot is to be created, a selection criteria of records from the source database to be included in the snapshot, and a desired fragmentation of the selected records in the snapshot. Each fragment being a named path in a hierarchical file system, each fragment comprising one or more parts, and each part comprising a file within a fragment. Such examples include receiving an instruction to create the snapshot in accordance with the creation specification. Such examples include retrieving, in response to receiving the instruction to create, one or more records from the source database in accordance with the creation specification. Such examples include communicating, via broadcast, the retrieved records to one or more creation listeners; and serializing, by each listener and in accordance with the creation specification, the broadcast records into the snapshot comprising the fragments and the parts.

Example #2 includes the features of Example #1, wherein the identity includes one or more of an identity of the source DBMS and a location of the source database. Example #3 includes the features or one or more of the prior examples wherein the selection criteria includes one or more of: an identity of one or more clusters of the source database, and one or more values of one or more fields of the records to be included. Example #4 includes the features or one or more of the prior examples wherein the desired fragmentation comprises one or more of: a maximum fragment size, a maximum part size, and the identity of one or more clusters of the source database by which to fragment the source database. Example #5 includes the features or one or more of the prior examples wherein a structure of the hierarchical file system is agnostic with respect to the source DBMS. Example #6 includes the features or one or more of the prior examples wherein the broadcast includes a plurality of datagrams of a packet-switched network. Example #7 includes the features or one or more of the prior examples wherein the datagrams are user datagram protocol (UDP) datagrams. Example #8 includes the features or one or more of the prior examples wherein each listener corresponds to a single cluster of one or more clusters identified in the creation specification. Example #9 includes the features or one or more of the prior examples, and additionally acknowledging a snapshot status of the broadcast records; the status including one of at least: successful creation of the record in the snapshot and unsuccessful creation of the record to the snapshot. Example #10 includes the features or one or more of the prior examples wherein acknowledging includes saving each acknowledgment in one or more files of the snapshot. Example #11 includes the features or one or more of the prior examples wherein one of the creation specification and the instruction to create is received via one of a REST interface and an input to a console application.

Example 12 includes the features or one or more of the prior examples and establishing a migration specification for the snapshot, at least in part by specification of: an identity of a target database to which the snapshot is to be migrated, a migration selection criteria of one or more fragments and parts from the snapshot to be migrated to the target database. Such examples include receiving an instruction to migrate the snapshot in accordance with the migration specification. Such examples include deserializing, by each of one or more migration listeners and in response to receiving the instruction to migrate, the snapshot in accordance with the migration specification. Example #13 includes the features or one or more of the prior examples wherein the identity includes one or more of an identity of a target DBMS and a desired location of the target database. Example #14 includes the features or one or more of the prior examples wherein the migration selection criteria includes one or more of: one or more values of one or more fields of the records to be migrated, an identity of one or more source clusters from which to migrate, an identity of one or more target clusters for migration. Example #15 includes the features or one or more of the prior examples and acknowledging a migration status of the records, the status comprising one of at least: successful migration and unsuccessful migration. Example #16 includes the features or one or more of the prior examples wherein acknowledgment includes saving each acknowledgment in one or more files of the snapshot. Example #17 includes the features or one or more of the prior examples wherein one of the migration specification and the instruction to migrate is received via one of a REST interface and an input to a console application. Example #18 includes the features or one or more of the prior examples, and establishing, prior to receiving the instruction to create, a keymap specification mapping references between source database tables, wherein, snapshot deserialization is further performed in accordance with the keymap specification.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium, e.g., a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A selective database migration device, the device comprising:
   a memory storing instructions; and
   at least one processor communicatively coupled with the memory and configured to;
      establish a creation specification for a snapshot of a subset of a source database of a source database management system (DBMS), at least in part by specification of;
         an identity of the source database from which the snapshot is to be created,
         a selection criteria of records from the source database to be included in the snapshot, and
         a desired fragmentation of the selected records in the snapshot, each fragment comprising a named path in a hierarchical file system, each fragment comprising one or more parts, and each part comprising a tile within a fragment;
      receive an instruction to create the snapshot in accordance with the creation specification:
      retrieve, in response to receiving the instruction to create, one or more records from the source database in accordance with the creation specification;

communicate, via broadcast, the retrieved records to one or more creation listeners; and serialize, by each listener and in accordance with the creation specification, the broadcast records into the snapshot comprising the fragments and the parts.

2. The device of claim 1, wherein the selection criteria comprises one or more of: an identity of one or more clusters of the source database, and one or more values of one or more fields of the records to be included.

3. The device of claim 1, wherein the at least one processor is flirther configured to acknowledge a snapshot status of the broadcast records, the status comprising one of at least: successful creation of the record in the snapshot and unsuccessful creation of the record to the snapshot.

4. The device of claim 1, wherein the at least one processor is further configured to:
establish a migration specification for the snapshot, at least in part by specification of:
an identity of a target database to which the snapshot is to be migrated, and
a migration selection criteria of one or more fragments and parts from the snapshot to be migrated to the target database;
receive an instruction to migrate the snapshot in accordance with the migration specification; and
deserialize, by each of one or more migration listeners and in response to receiving the instruction to migrate, the snapshot in accordance with the migration specification.

5. The device of claim 4, wherein the at least one processor is further configured to acknowledge a migration status of the records, the status comprising one of at least: successful migration and unsuccessful migration.

6. The device of claim 4, wherein the at least one processor is further configured to establish, prior to receiving the instruction to create, a keymap specification mapping references between source database tables, wherein, snapshot deserialization is further performed in accordance with the keymap specification.

7. A computer-implemented method for selective migration of a database, comprising:
establishing a creation specification for a snapshot of a subset of a source database of a source database management system (DBMS), at least in part by specification of:
an identity of the source database from which the snapshot is to be created,
a selection criteria of records from the source database to be included in the snapshot, and
a desired fragmentation of the selected records in the snapshot, each fragment comprising a named path in a hierarchical file system, each fragment comprising one or more parts, and each part comprising a file within a fragment:
receiving an instruction to create the snapshot in accordance with the creation specification;
retrieving, in response to receiving the instruction to create, one or more records from the source database in accordance with the creation specification;
communicating, via broadcast, the retrieved records to one or more creation listeners; and
serializing, by each listener and in accordance with the creation specification, the broadcast records into the snapshot comprising the fragments and the parts.

8. The method of claim 7, wherein the identity comprises one or more of an identity of the source BMS and a location of the source database.

9. The method of claim 7, wherein the selection criteria comprises one or more of an identity of one or more clusters of the source database, and one or more values of one or more fields of the records to be included.

10. The method of claim 7, wherein the desired fragmentation comprises one or more of: a maximum fragment size, a maximum part size, and the identity of one or more clusters of the source database by which to fragment the source database.

11. The method of claim 7, wherein a structure of the hierarchical tile system is agnostic with respect to the source DBMS.

12. The method of claim 7, wherein the broadcast comprises a plurality of datagrams of a packet-switched network.

13. The method of claim 12, wherein the datagrams are user datagram protocol (UDP) datagrams.

14. The method of claim 7, wherein each listener corresponds to a single cluster of one or more clusters identified in the creation specification.

15. The method of claim 7, further comprising acknowledging a snapshot status of the broadcast records, the status comprising one of at least: successful creation of the record in the snapshot and unsuccessful creation of the record to the snapshot.

16. The method of claim 15, wherein acknowledging comprises saving each acknowledgment in one or more files of the snapshot.

17. The method of claim 7, wherein one of the creation specification and the instruction to create is received via one of a REST interface and an input to a console application.

18. The method of claim 7, further comprising:
establishing a migration specification for the snapshot, at least in part by specification of:
an identity of a target database to which the snapshot is to he migrated, and
a migration selection criteria one or more fragments and parts from the snapshot to be migrated to the target database;
receiving an instruction to migrate the snapshot in accordance with the migration specification; and
deserializing, by each of one or more migration listeners and in response to receiving the instruction to migrate, the snapshot in accordance with the migration specification.

19. The method of claim 18, wherein the identity comprises one or more of an identity of a target DBMS and a desired location of the target database.

20. The method of claim 18, wherein the migration selection criteria comprise one or more of: one or more values of one or more fields of the records to be migrated, an identity of one or more source clusters from which to migrate, an identity of one or more target clusters for migration.

21. The method of claim 18, further comprising acknowledging a migration status of the records, the status comprising one of at least: successful migration and unsuccessful migration.

22. The method of claim 21, wherein acknowledgment comprises saving each acknowledgment in one or more files of the snapshot.

23. The method of claim 18, wherein one of the migration specification and the instruction to migrate is received via one of a REST interface and an input to a console application.

24. The method of claim 18, further comprising establishing, prior to receiving the instruction to create, a keymap specification mapping references between source database tables, wherein, snapshot deserialization is further performed in accordance with the keymap specification.

25. A non-transitory computer-readable medium storing instructions thereon that, when executed by at least one computing device, causes the at least one computing device to perform operations comprising:
  establishing a creation specification for a snapshot of a subset of a source database of a source database management system (DBMS), at least in part by specification of:
    an identity of the source database from which the snapshot is to be created,
    a selection criteria of records from the source database to he included in the snapshot, and
    a desired fragmentation of the selected records in the snapshot, each fragment comprising a named path in a hierarchical file system, each fragment comprising one or more parts, and each part comprising a file within a fragment;
  receiving an instruction to create the snapshot in accordance with the creation specification;
  retrieving, in response to receiving the instruction to create, one or more records from the source database in accordance with the creation specification;
  communicating, via broadcast, the retrieved records to one or more creation listeners; and
  serializing, by each listener and in accordance with the creation specification, the broadcast records into the snapshot comprising the fragments and the parts.

26. The computer-readable medium of claim 25, wherein the desired fragmentation comprises one or more of a maximum fragment size, a maximum part size, and the identity of one or more clusters of the source database by which to fragment the source database.

27. The computer-readable medium of claim 25, further storing instructions thereon that, when executed by the at least one computing device, causes the at least one computing device to perform operations comprising acknowledging a snapshot status of the broadcast records, the status comprising one of at least; succesful creation of the record in the snapshot and unsuccessful creation of the record to the snapshot.

28. The computer-readable medium of claim 25, further storing instructions thereon that, when executed by at least one computing device, causes the at least one computing device to perform operations comprising:
  establishing a migration specification fOr the snapshot, at least in part by specification of:
    an identity of a target database to which the snapshot is to be migrated, and
    a migration selection criteria of one or more fragments and parts from the snapshot to be migrated to the target database;
  receiving an instruction to migrate the snapshot in accordance with the migration specification; and
  deserializing, by each of one or more migration listeners and in response to receiving the instruction to migrate, the snapshot in accordance with the migration specification.

29. The computer-readable medium of claim 28, further comprising acknowledging a migration status of the records, the status comprising one of at least: successful migration and unsuccessful migration.

30. The computer-readable medium of claim 28, further storing instructions thereon that, when executed by at least one computing device, causes the at least one computing device to perform operations comprising establishing, prior to receiving the instruction to create, a keymap specification mapping references between source database tables, Wherein, snapshot deserialization is further performed in accordance with the keymap specification.

* * * * *